United States Patent [19]

Stewart et al.

[11] Patent Number: 5,645,694
[45] Date of Patent: Jul. 8, 1997

[54] PROCESS AND APPARATUS FOR VAPOR COMPRESSION DISTILLATION

[75] Inventors: James M. Stewart, Greenville; Bobby D. Morris, Greer, both of S.C.

[73] Assignee: Vacom II, L.P., Atlanta, Ga.

[21] Appl. No.: 40,767

[22] Filed: Mar. 31, 1993

[51] Int. Cl.$^6$ .................................................... B01D 1/28
[52] U.S. Cl. .............................. 203/22; 203/10; 203/23; 203/26; 159/24.1; 159/24.2; 159/DIG. 42; 202/177; 202/180; 202/182; 202/237; 202/269
[58] Field of Search ..................... 203/26, 11, 10, 203/DIG. 4, 22, 24, 23; 202/237, 182, 180, 197, 176, 177, 181, 269; 159/DIG. 42, 24.1, 24.2

[56] References Cited

U.S. PATENT DOCUMENTS

| | | | |
|---|---|---|---|
| 1,461,640 | 7/1923 | Wirth-Frey | 159/24.1 |
| 1,489,009 | 4/1924 | Rohmer et al. | 159/24.1 |
| 1,827,846 | 10/1931 | Holmquist | 159/24.1 |
| 2,441,361 | 5/1948 | Kirgan | 203/26 |
| 2,449,587 | 9/1948 | Chambers | 159/24.1 |
| 3,000,795 | 9/1961 | Goeldner | 159/24.1 |
| 3,245,883 | 4/1966 | Loebel | 203/24 |
| 3,389,059 | 6/1968 | Goeldner | 203/26 |
| 3,461,460 | 8/1969 | McGrath . | |
| 3,471,373 | 10/1969 | Pottharst | 203/26 |
| 4,217,176 | 8/1980 | Antony | 203/26 |
| 4,259,160 | 3/1981 | McClure . | |
| 4,710,272 | 12/1987 | Passarelli et al. . | |
| 4,731,424 | 3/1988 | Fujimoto et al. . | |
| 4,783,242 | 11/1988 | Robbins . | |

*Primary Examiner*—Wilbur Bascomb, Jr.
*Attorney, Agent, or Firm*—Hardaway Law Firm PA

[57] ABSTRACT

An improved vapor compression distillation process and apparatus are provided having a container with a substantially horizontal longitudinal center axis, two opposing end plates closing each end of the container, a first and second passage area defined within and on opposing ends of the container, each adjacent one of the end plates, a collecting chamber defined within the container between the first and second passage areas, a plurality of generally horizontal tubes spacedly exposed within the collecting chamber generally parallel to the longitudinal axis of the container, each of the tubes having two opposing ends which open into the first and second passage areas respectively, two opposing plates positioned on opposite ends of the horizontal tubes, each plate engaging similar ends of the horizontal tubes, a vapor compressor attached to the container such that the vapor compressor communicates with an upper area of the collecting chamber and communicates with the first passage area, at least one passage for passing a liquid into or out of the collecting chamber at a bottom thereof, and first and second conduits for passing a liquid into or out of the first and second passage areas at bottom areas thereof.

25 Claims, 3 Drawing Sheets

PROCESS AND APPARATUS FOR VAPOR COMPRESSION DISTILLATION

BACKGROUND OF THE INVENTION

This invention relates generally to the art of energy recycling processes and apparatuses, and more particularly to an improved process and apparatus for vapor compression distillation.

A variety of processes and apparatuses utilizing vapor compression for distillation exist in the prior art. Such prior art processes and apparatuses frequently employ an evaporator chamber for creating vapor from a liquid passing therethrough. The vapor is usually compressed to enable its use as a primary source of heat in the evaporator chamber. The compressed vapor is condensed and its heat is transferred to the heated liquid by means of an indirect contact heat transfer element such as a tube bundle.

Frequently, some type of secondary method or medium is needed for cooling in distillation apparatuses. Most conventional distillation systems including vacuum distillers require methods for condensation cooling. Huge amounts of cold water or refrigeration systems are commonly used. As an environmental note, refrigeration systems using freon are not environmentally friendly and in fact it will be illegal to manufacture freon in the United States after 1995.

A variety of processes and apparatuses teaching compression of vapors from evaporated liquids are disclosed in U.S. Pat. Nos. 1,461,640; 3,109,782; 3,192,130; 3,423,293; 3,480,515; 3,488,261; 3,849,259; 3,901,768; 3,956,072; 4,082,616; 4,259,160; 4,710,272; and 4,783,242.

U.S. Pat. No. 3,488,261 discloses a vapor compression unit for removing impurities from liquids utilizing an evaporator chamber, a vapor compressor, and a power source which can also act as a heat source. A vent condenser is incorporated into the unit in the outlet portion of the manifold on the tube bundle associated with the evaporator so that uncondensed vapors exiting from the tube bundle of the evaporator pass immediately over the vent condenser to further condense the vapors prior to exhausting the uncondensed vapors and non-condensable ones to the atmosphere. An exhaust gas boiler is also included in the evaporator chamber and exhaust gases from the power source are used to generate additional vapors for the system.

Methods for recycling energy in counterflow heat exchange and distillation are disclosed in U.S. Pat. Nos. 4,671,856 and 4,769,113. U.S. Pat. No. 4,671,856 teaches a method of producing a concentrate and a distillate from a given feed material which is at least in part liquid, comprising providing a vertically extending boiling chamber and a vertically extending condensing chamber on opposite sides of a vertically extending plate member which includes a specific boiling surface on one side thereof and a condensing surface on an opposite side thereof. The plate member is sufficiently thermally conductive and sufficiently thin to conduct heat across the two surfaces relatively efficiently. A continuous feed supply is replenished into the boiling chamber so that the boiling chamber is filled with feed material to a level which entirely covers the boiling surface when the feed material is caused to boil. Boiling of the feed material occurs evenly and produces a vapor from some of the feed material and a concentrate from the rest of the material. As it is formed, the concentrate is continuously directed out of the boiling chamber into a collection chamber, and the vapor is directed out of the boiling chamber and into the condensing chamber through a compression chamber where, by means of compression, the vapor is elevated in pressure by an amount not to exceed about two psi higher than the minimum required for condensation at atmospheric pressure. A portion of the vapor is directed vertically downward uniformly and evenly across the entire condensing surface of the plate member so as to cause it to condense and form a distillate thereon and at the same time, transfer its heat of condensation across the plate member to the boiling surface for aiding in boiling the feed material at the boiling surface. As distillate is formed on the condensing surface, it is continuously directed out of the condensing chamber. A second, vertically extending plate member is included in the boiling chamber and defines a surface spaced a small distance from and in confronting relationship with the common plate member such that the two plate members define a vertically extending, laterally narrow boiling chamber.

U.S. Pat. No. 4,769,013 also discloses a method of producing a concentrate and a distillate from a given feed material which is at least in part liquid; however, a spiral-shaped boiling chamber, a vertically extending spiral-shaped condensing chamber, and a spiral-shaped common plate member are utilized.

Despite the various prior art techniques utilizing vapor compression distillation, there exists much room for improvement in the art of vapor compression distillation.

SUMMARY OF THE INVENTION

It is therefore an object of this invention to provide an improved process and apparatus for vapor compression distillation.

It is another object of this invention to provide a process and apparatus for vapor compression distillation which is highly efficient and economical as well as less complex than prior art processes.

It is another object of this invention to provide a process and apparatus for vapor compression distillation which can easily be used for a variety of processes, including purifying impure water and resource recovery.

It is yet another object of this invention to provide an improved process and apparatus for vapor compression distillation which utilizes strategically located components for maximum stratification of temperature and non-condensable gases.

It is a further object of this invention to provide an improved process and apparatus for vapor compression distillation with improved sanitary advantages.

It is a still further object of this invention to provide an improved process and apparatus for vapor compression distillation which accomplishes distillation without scale build-up on the heat transferring surfaces.

These as well as other objects are accomplished by a vapor compression distillation process and apparatus comprising a container having a substantially horizontal longitudinal center axis, opposing end plates closing each end of the container, a first and second passage area defined within and on opposing ends of the container, a collecting chamber defined within the container between the first and second passage areas, a plurality of generally horizontal tubes spacedly disposed within the collecting chamber generally parallel to the longitudinal axis of the container, each of the tubes having opposing ends which open into the first and second passage areas, two opposing plates positioned on opposite ends of the horizontal tubes, each plate engaging similar ends of the horizontal tubes, a vapor compressor attached to the container such that the vapor compressor communicates with an upper area of the collecting chamber and communicates with the second passage area, at least one passage means for passing a liquid into or out of the collecting chamber at a bottom area of the collecting chamber, and conduit means for passing a liquid into or out of the first and second passage area at bottom areas thereof.

Provision can be made to continuously circulate the liquid in the collecting chamber in order to monitor its concentration. When at the desired concentration, it is diverted outside the system.

DETAILED DESCRIPTION

In accordance with this invention, it has been found that vapor compression distillation may be improved by the process and apparatus described herein. The improved vapor compression distillation process and apparatus of this invention use no chemicals, exchange beds or other media and are highly efficient and economical as well as less complex than prior art processes and apparatuses. Such process and apparatus according to this invention can easily be used for a variety of processes, including purifying impure water and resource recovery. The improved process and apparatus for vapor compression distillation according to this invention utilize strategically located components for maximum stratification of temperature and non-condensable gases. Furthermore, quite advantageously, this process and apparatus for vapor compression distillation accomplish distillation without scale build-up on the heat transferring surfaces. It has further been found that such improved process and apparatus for vapor compression distillation provide improved sanitary advantages. Further advantages and features will become apparent from the following description given with reference given to the various figures of drawing.

The vapor compression distillation apparatus according to the present invention provides a novel process and apparatus for distilling or treating process waste water. Various uses exist within this arena, and the process and apparatus taught herein is particularly suitable for the recovery of resources such as water, metals, minerals, chemicals and energy. Additionally, the process and apparatus according to this invention reduce the volume of process waste for disposal and/or treatment or waste minimization. Accordingly, a significant advancement in waste minimization is disclosed herein.

Figures 1, 2:
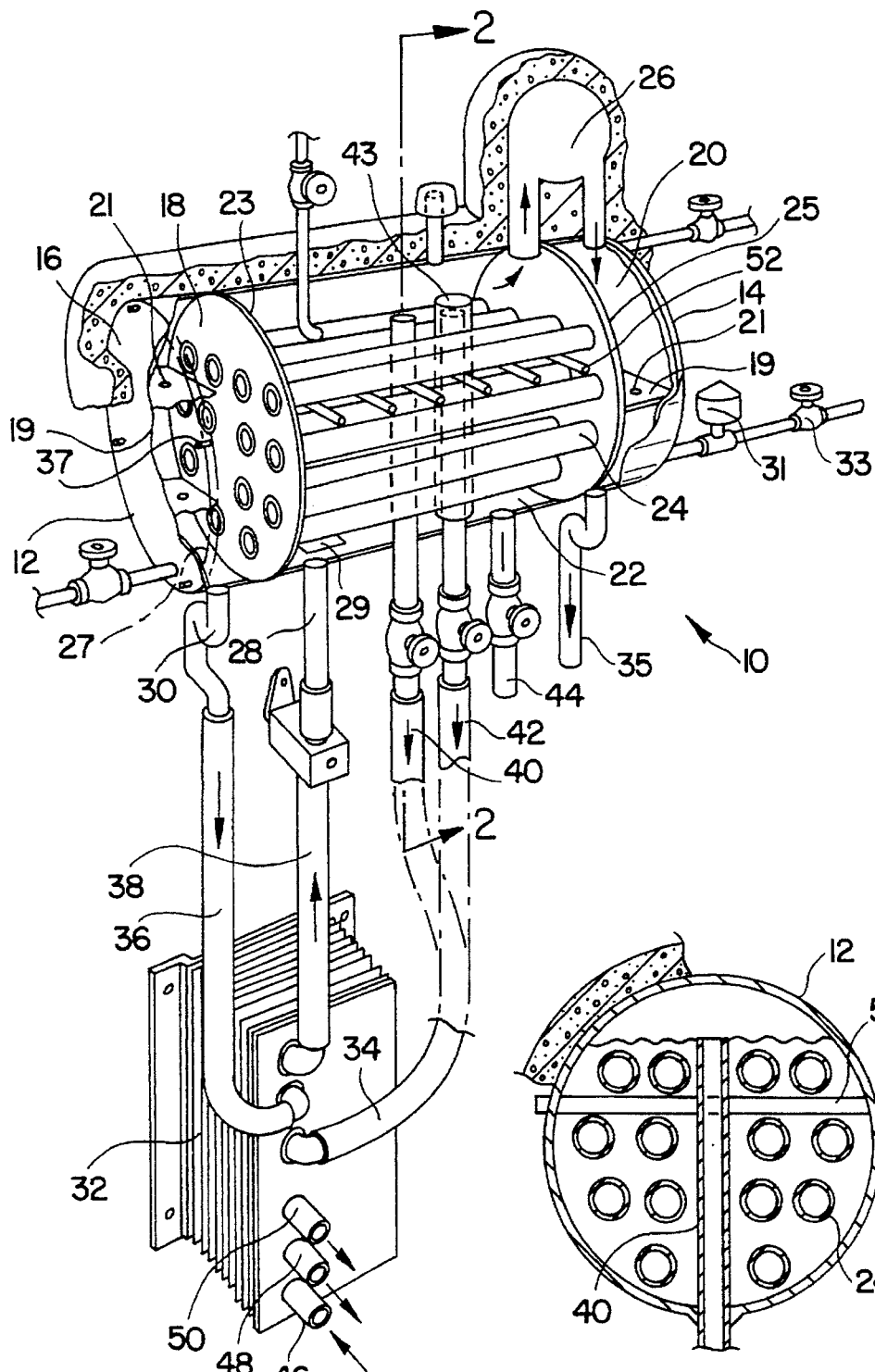
FIG. 1 of the drawings is a perspective view of a vapor compression distillation apparatus according to this invention.
FIG. 2 of the drawings is a cross section view drawn along line 2—2 of FIG. 1.
Figure 4:
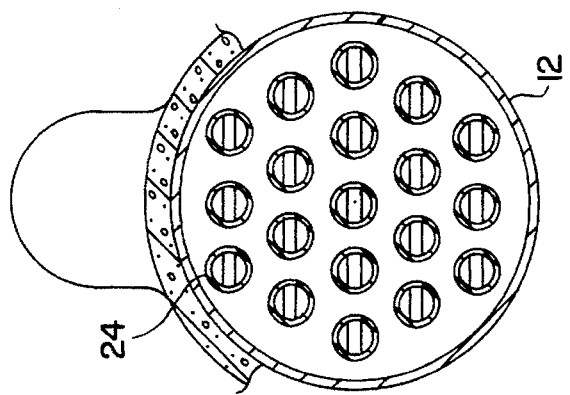
FIG. 4 of the drawings is a cross section view drawn along line 4—4 of FIG. 3.

FIG. 1 of the drawings is a perspective view of a vapor compression distillation apparatus 10 according to the present invention. The distillation apparatus 10 is based upon adiabatic compression of vapor and using the resulting temperature rise, while the latent heat remains the same, to boil more liquid to make more vapor. This process can be repeated on and on, and in a perfect system, the only energy needed for distillation by this process is that energy required to operate the vapor compressor. This energy is substantially less than that required to boil the same liquid using sensible heat.

As illustrated, vapor compression distillation apparatus 10 is unitary and comprises a container 12 shown as cylindrical in shape which can be insulated and which has a substantially horizontal longitudinal center axis and has two opposing end plates 14 and 16 which close each end of container 12. A first passage area 18 and a second passage area 20 are defined within and on opposing ends of container 12, adjacent to end plates 16 and 14 respectively. Container 12 defines a collecting chamber 22 therein between first passage area 18 and second passage area 20. A plurality of generally horizontal tubes 24 are spacedly disposed within collecting chamber 22 generally parallel to the longitudinal axis of container 12, each of the horizontal tubes 24 having opposing ends, one of the ends opening into first passage area 18 and the other end opening into second passage area 20. Plates 23 and 25 are positioned on opposite ends of horizontal tubes 24 and also serve to help define first and second passage areas 18 and 20.

Attached to the top of container 12 is a vapor compressor 26 which communicates with an upper area of collecting chamber 22 and also communicates with second passage area 20.

According to the present invention, there exists at least one passage means 28 adapted for passing a liquid into or out of collecting chamber 22 at a bottom area thereof. Also, a conduit means 30 is provided at a bottom area of first passage area 18 and is adapted for passing a liquid into or out of first passage area 18.

An especially advantageous feature of vapor compression distillation apparatus 10 is that end plates 14 and 16 are removable thereby allowing easy access to the internal components such as for cleaning purposes. It is envisioned that any conventional means can be used to hold the end plates in position as FIG. 1 illustrates flanges 27 extending inwardly from the end of the container 12 and bolts 37 which pass through each end plate fastening the plates to the flanges.

In a preferred embodiment, as vapor compression distillation apparatus 10 functions, a heat exchanger 32 is used in association therewith as illustrated in FIG. 1 of the drawings. It is envisioned that the heat exchanger may be a shell and tube design or of other conventional types such as plate and frame. Heat exchanger 32 is adapted to utilize heated material coming from vapor compression distillation apparatus 10 in order to heat a feed material which is to be passed into vapor compression distillation apparatus 10. Such feed material from vapor compression distillation apparatus 10 enters heat exchanger 32 through hose 34 while a distillate formed within vapor compression distillation apparatus 10 enters heat exchanger 32 through hose 36. After being heated by circulation through heat exchanger 32, hose 38 provides a passage for exit of the feed material from heat exchanger 32 and entrance into vapor compression distillation apparatus 10 through passage means 28.

As illustrated in FIG. 1, a plurality of exit means exist to draw a concentrate material out of collecting chamber 22 and direct it into heat exchanger 32 through hose 34, as shown by exit means 40 and 42. Exit means 40 is an overflow to be used when matter floats on the top of the concentrate. Exit means 42 is used when heavy portions of the concentrate sink to the bottom. Exit means 44 is a drain used for flushing or cleaning. Illustrated at the bottom of heat exchanger 32 is conduit 46 which is adapted to receive flow of a feed material which is then circulated through heat exchanger 32 and passes through hose 38 and passage means 28 into collecting chamber 22. Also illustrated at the bottom of heat exchanger 32 is conduit 48 for the passage of the product or distillate out of heat exchanger 32 and conduit 50 for passage of concentrate out of heat exchanger 32.

The degree of concentration is determined by the volume of flow entering passage means 28.

Figure 6:
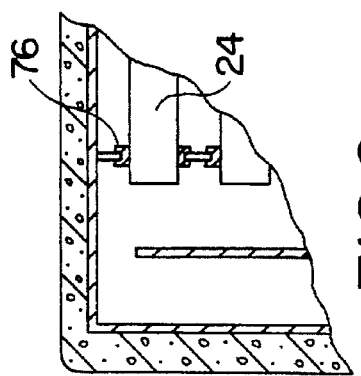
FIG. 6 of the drawings is a perspective view of elastomer grommets used for sealing according to this invention.

As illustrated in FIG. 6, elastomer grommets 76 are preferably utilized in the vapor compression distillation apparatus as they improve manufacturing costs by providing a low cost method of sealing plates 23 and 25, illustrated in FIG. 1, with horizontal tubes 24 therethrough. They also allow for small movement due to differing thermal expansion and also will insulate to prevent electrolytic corrosion when used in applications in which it may be desirable to use tubes and shell of different materials. Elastomer grommets 76 therefore allow the use of materials of different coefficients of thermal expansion and also reduce maintenance costs.

Figure 7:
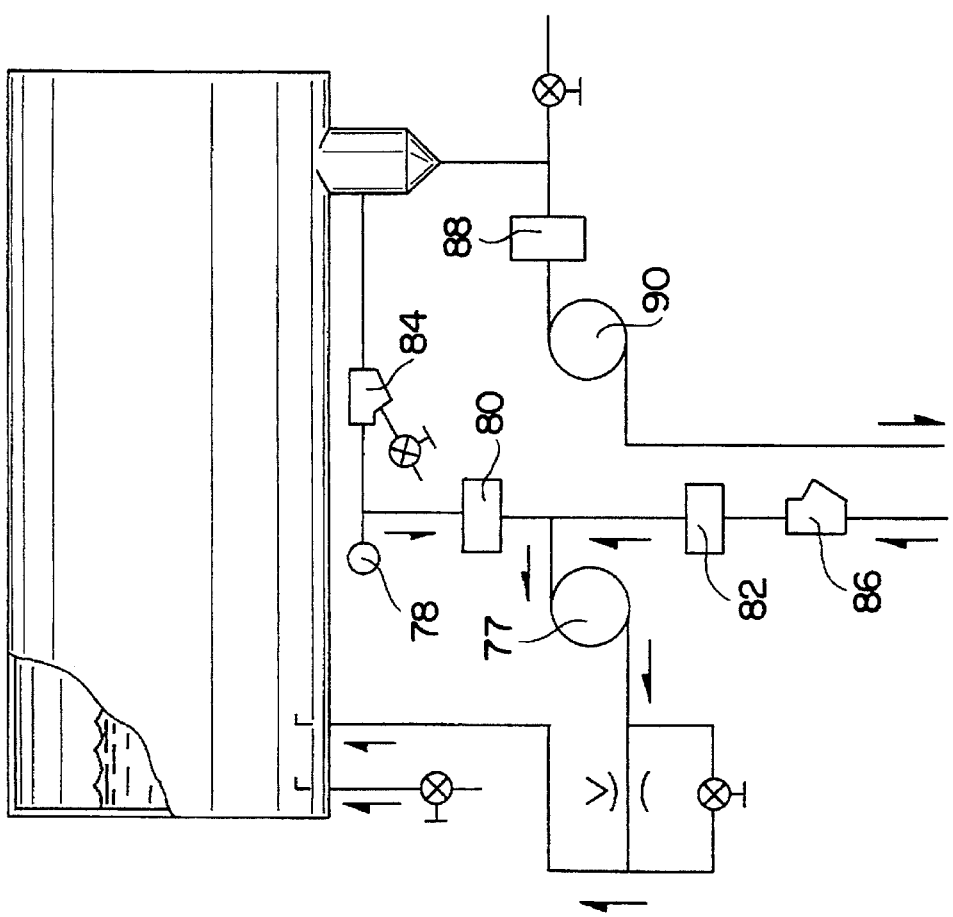
FIG. 7 of the drawings is a schematic diagram of a continuous circulation system according to this invention.

A preferred embodiment of a continuous circulation system is envisioned according to this invention and is illustrated in FIG. 7 of the drawings in a schematic diagram. In this system, liquid is caused to continuously circulate by a first pump 77 in the collecting chamber of the vapor compression distillation apparatus and its concentration is monitored. Controller 78 acts as a sensor and controls and maintains liquid within the collecting chamber at a desired level. Controller 78 causes solution to be added automatically as needed to maintain the desired liquid level. Valves 80 and 82 operate to control the flow of liquid, and strainers 84 and 86 filter the flow of liquid.

To operate in continuous circulation, valve 80 is open while valve 82 is closed, thereby allowing the flow exiting the vapor compression distillation apparatus to pass through strainer 84, through valve 80, and back into the vapor compression distillation apparatus being pumped by first pump 77.

For a supply of feed stock to enter the vapor compression distillation apparatus, valve 80 is closed while valve 82 is open thereby allowing pump 77 to pump an incoming liquid through strainer 86, through valve 82 and into the vapor compression distillation apparatus.

Valve 88 is also illustrated in FIG. 7 and works with a second pump 90 to discharge liquid from the vapor compression distillation apparatus. Valve 88 opens to receive liquid therethrough which is pumped to a discharge site by pump 90.

A density controller can be included to sense the density of the concentrate and controls the discharge mechanisms which can be values or pumps. This feature allows the density to be controlled to a desired level.

The production volume can be maximized by a means to control the heat load input. Flow control of a cold entering solution is by conventional means to assure the maximum utility of the primary heat source.

The vapor compression distillation apparatus according to this invention can be utilized for vapor compression distillation primarily by two processes in which the structure of the vapor compression distillation apparatus differs only by minor modifications in the preferred embodiments. In both of these processes, cold liquid enters at the bottom of the vapor compression distillation apparatus to assist in natural stratification of temperature. Also, the processes permit the volume of sludge in a solution passing through the apparatus to be reduced by an amount equal to the amount contained in the source solution.

The vapor compression distillation apparatus according to this invention has numerous useful applications. An illustrative, but not exhaustive, list of possible applications follows below.

USES FOR VAPOR COMPRESSION DISTILLATION APPARATUS

1. Distillation of brackish or sea water
2. Concentration of plating chemicals for recycling
3. Treatment by distillation of industrial waste water
4. Treatment of spray paint effulent and return of treated water to rinse line
5. Treatment by distillation and concentration of textile dye effulent
6. Concentration of fruit juices for reduced volume
7. Concentration of radiator shop effulents by portable vapor compression distillation unit
8. Production of distilled water for feed stock for power boilers
9. Production of portable distilled drinking water for remote locations
10. Recovery of minerals from sea water by concentration
11. Reduction of volume of toxic or dangerous medical (hospital) waste.
12. Treatment by concentration and distillation of steel mill effulents
13. Distillation of wines into liquers
14. Distillation of water with impurities and hardness for soft drink bottling plants.
15. Treatment of effulents from food processing plants
16. Production of maple syrup through evaporation
17. Treatment of effulents from laundry establishments to remove toxic waste through concentration Two primary processes for vapor compression distillation will be individually discussed below.

EXTERNAL VAPOR COMPRESSION DISTILLATION

FIG. 1 of the drawings is illustrative of a vapor compression distillation apparatus specifically adapted for external distillation in that it is designed for a feed material which is to be distilled to be maintained within collecting chamber 22 surrounding horizontal tubes 24.

FIG. 1 illustrates a vapor compression distillation apparatus ideal for the distillation of simple seawater. In this manner, feed material held within collecting chamber 22 is in complete contact with the exterior of horizontal tubes 24. A feed material held within collecting chamber 22 is intended to be maintained at a predetermined level above horizontal tubes 24 as illustrated in the cross section view shown in FIG. 2.

A continuous supply of feed material is passed through passage means 28 into collecting chamber 22 to the predetermined levels above horizontal tubes 24 such that the feed material surrounds horizontal tubes 24. A baffle 29 is positioned in front of the passage to help disperse the entering feed material. Feed material is boiled within collecting chamber 22, thereby producing a vapor from some of the feed material and a concentrate from a remainder of the feed material.

The vapor that is formed is passed to vapor compressor 26 while concentrate that is formed can exit out of collecting chamber 22 through exit means 40 or 42 as needed. Exit means 42 is a simple overflow outlet that communicates above the predetermined level of the feed material within collecting chamber 22, and can be used when the concentrate that is formed is not important, such as in desalinating sea water. The shroud 43 that is illustrated as surrounding exit means 42 insures that the most dense liquid is discharged. Where it is important that concentrate formed within collecting chamber 22 must be closely controlled, as in a metal plating tank discharge, the concentrate must be removed continuously from the bottom of collecting chamber 22 and pumped passed a suitable sensor to determine whether it is to be directed back to the tank or discharged. Occasionally, concentrate formed within collecting chamber 22 will develop a floating scum which must be removed. Exit means 40 allows this to be accomplished.

A plurality of spaced heating tubes 52 extend through collecting chamber 22 in contact with the feed material contained therein. Preferably, heating tubes 52 are positioned generally perpendicular to horizontal tubes 24 and, in order to make best use of temperature stratification, are positioned approximately below the predetermined level of the feed material. Having heating tubes 52 near the upper liquid level helps achieve maximum temperature at the highest point of liquid level to provide optimum evaporation of the liquid and mechanically entrain the non-condensable gases. Immersed heating tubes 52 bring the system up to temperature after a shut-down, and also maintain the feed material at a desired temperature.

As the vapor is formed it is passed through vapor compressor 26, where it is compressed and elevated in pressure. The compressed vapor is then passed through second passage area 20 and into horizontal tubes 24 where the vapor is condensed as distillate and gives up its heat to the feed material within collecting chamber 22. As the vapor passes from vapor compressor 26 and into second passage area 20, baffles 19 are positioned within first and second passage areas 18 and 20 to direct the hot vapor to horizontal tubes 24 to provide the best use of heat in the vapor to achieve optimum evaporation of condensable gases. Baffles 19 direct the cooling vapor in a serpentine course toward the bottom of the vessel where maximum condensation of condensable gases occurs. There is no need for baffles 19 to be vapor-tight. In fact, small apertures 21 preferably are defined by baffles 19 to allow condensate to drain. Non-condensable gases are trapped at the end of the vapor course and are effectively separated from the condensable gases. Baffles 19 aid non-condensable gas being entrained in the vapor flow and thereby prevent it from forming dead pockets within horizontal tubes 24.

Vents such as auto vent 31 and manual vent 33 are preferably utilized for the release of vapor not circulating. Full advantage of the heat in the non-condensable gases is taken as heat is transferred to the liquid. The mass flow adds turbulence which adds to the heat transferability of the vapor. The distillate is directed through horizontal tubes 24 in a winding path terminating in either second passage area 20 or first passage area 18. Passing through second passage area 20, the distillate is directed out of vapor compression distillation apparatus 10 through conduit means 30. Conduit means 35 at the bottom of second passage area 20 also can be used for distillate to exit.

As discussed previously, heat exchanger 32 can be used in association with vapor compression distillation apparatus 10 in order to utilize distillate and concentrate formed by vapor compression distillation apparatus 10 to heat a feed material which is to be passed into collecting chamber 22. Heat exchanger 32 can be any suitable heat exchanger such that it allows the sensible heat from both the distillate and the concentrate formed with vapor compression distillation apparatus 10 to be reclaimed in order to preheat the incoming feed material.

INTERNAL VAPOR COMPRESSION DISTILLATION

For the process of internal vapor compression distillation, referring to FIGS. 3 through 7, it is intended that a feed material that is to be boiled be maintained within horizontal tubes 24. This internal process is quite advantageous for sanitary reasons, for example, when health regulations require frequent brushing of those areas in contact with the feed material. This internal process is also beneficial when feed material scales horizontal tubes 24 heavily, requiring that they be de-scaled mechanically, for instance, with a wire brush. In such circumstances, the removability of end plates 14 and 16 proves quite advantageous also.

Figure 3:
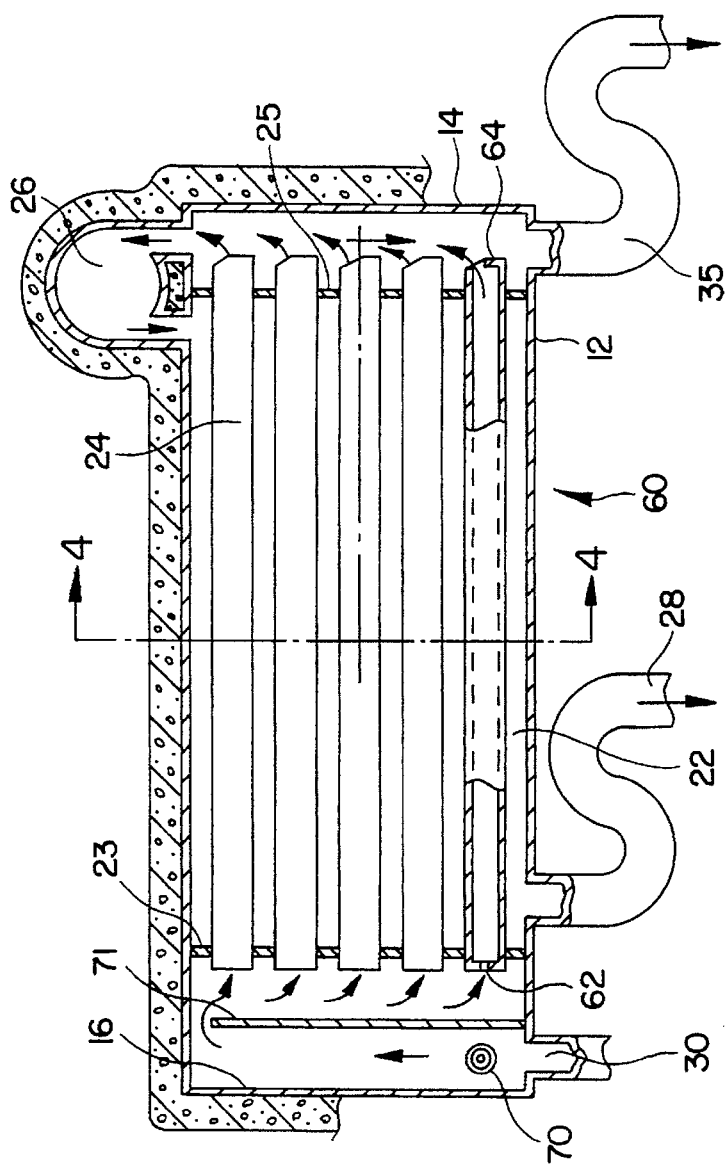
FIG. 3 of the drawings is a side elevational view of another embodiment of a vapor compression distillation apparatus according to this invention.
Figure 5:
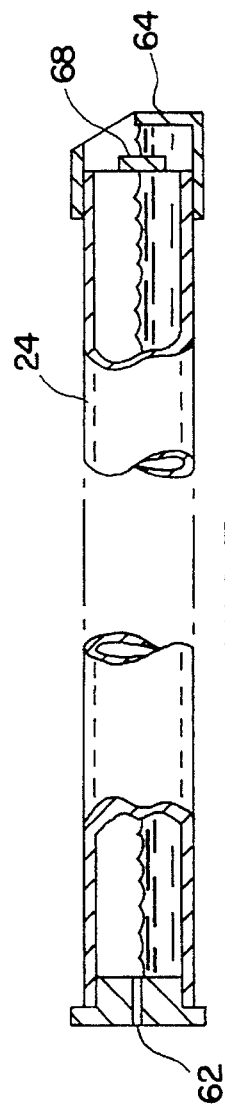
FIG. 5 of the drawings is a side view in partial section of a horizontal tube utilized in a vapor compression distillation apparatus according to this invention.

A side elevational view of the vapor compression distillation apparatus specifically adapted for internal distillation is illustrated in FIG. 3 of the drawings and designated as apparatus 60. The minor modifications present in apparatus 60 that differ from apparatus 10, designed for external vapor compression distillation compression, are but a few. In order for the feed material to pass into horizontal tubes 24, each of the horizontal tubes 24 defines a small orifice 62 in the ends which opens into first passage area 18. At the opposite ends of horizontal tubes 24, each of the horizontal tubes 24 defines barriers 64 in order to maintain the feed material at a predetermined level within horizontal tubes 24. Concentrate can exit through second conduit means 35 defined at a bottom of second passage area 20 in order to allow a concentrate to pass therethrough. In the preferred embodiment, apparatus 60 also includes a dam 68 proximate barrier 64 in order to help maintain feed material within horizontal tubes 24 at a predetermined level. First passage area 18 includes a heater 70 therein proximate conduit means 30, and first passage area 18 is partially divided by a partition 71 which is longitudinally positioned generally parallel to end plate 16 so as to substantially divide first passage area 18 while still allowing a flow of feed material therethrough at a top portion thereof.

Utilizing apparatus 60, a continuous supply of feed material is directed through conduit means 30 into first passage area 18 where heater 70 can heat the feed material as it passes therethrough prior to entering horizontal tubes 24. From first passage area 18, the feed material is then directed through orifices 62 into horizontal tubes 24 to a predetermined level as maintained by barriers 64 and dams 68, best illustrated in FIG. 5. The feed material is boiled within horizontal tubes 24, thereby producing a vapor from some of the feed material and concentrate from a remainder of the feed material. The vapor that is formed exits horizontal tubes 24 passing into second passage area 20 where it is directed upwardly through vapor compressor 26. Simultaneously, the concentrate that is formed is directed downwardly through second passage area 20 and out conduit means 35.

As the vapor passes through vapor compressor 26, it is compressed and adiabatically elevated in pressure and directed into collecting chamber 22 where the vapor is condensed as distillate surrounding and giving up its heat to horizontal tubes 24 having feed material therein. The distillate that is formed is directed out of collecting chamber 22 through passage means 28.

The internal process of vapor compression distillation probably will not have as great an output per square foot of tubes as will the external process of vapor compression distillation. Also, because there will be a significant lag between metering the feed material into the system and sensing its composition as it leaves the system, close control of the composition of the exiting concentrate might be difficult.

As discussed previously, a heat exchanger such as heat exchanger 32 shown in FIG. 1 may be connected and used with apparatus 60 in order to preheat a feed material prior to entering apparatus 60.

Referring now to both process embodiments for vapor compression distillation, it has been demonstrated that 60 inches of water pressure raises the temperature of water vapor by about 10° F. Within a given system the output is proportional to the temperature rise, which is proportional to the pressure rise. The mechanical energy (sensible heat) added by the vapor compressor is reclaimed, but without the loop effect.

In the vapor compression distillation processes taught herein, it is clear that the process solution is the cooling medium and acts on its own vapor to condense. Accordingly, there is no requirement or need for any other cooling medium or method.

An off-the-shelf regenerative blower is suitable for compressing water vapor by about 60 inches of water. With a waterbased feed material, a convenient concentrate temperature is 216° F. (1 psig). At this temperature, the entire system is under low pressure, reducing problems with shaft-seal leaks and allowing simple bucket traps to be used. Reduced enthalpy at higher temperatures is not important; what is lost in evaporation is gained in condensation.

Most scale forms from minerals in aqueous solution as heat transferring surfaces reach temperatures greater than approximately 240° F. The process and apparatus according to this invention, however, use a low operating temperature, the maximum operating temperature being around 220° F. A low process temperature differential is also utilized. These advantageous features permit precipitation to occur rather than attachment of minerals on the heat transferring surfaces.

Certain food materials and pharmaceuticals might require lower temperatures. With modifications of seals and traps, this can be accomplished. A vacuum pump will be required to vent noncondensable gas.

The vapor compression apparatus and process according to this invention can be used with any two-phase liquid for fractional distillation. A fractionated distillate can be provided according to this invention that is pure enough to recycle (as with distilled water). This distillation process enriches the concentration of primary metals for ease of metals recovery. Solutions with concentrations of heavy metals and some heavy particulate matter can be processed. Recycling of recovered resources is also made possible by this vapor compression distillation apparatus. It is envisioned that several vapor compression distillation apparatuses can be used in series as desired or required as with a solution where several two-phase liquids are in solution.

In providing a fractionated distillate, the vapor compression distillation apparatus fractions off a liquid from a solution and a distillate results. As distillate is removed from the feed stock, the density of the liquid becomes heavier. At a given point of concentration and thermal conditions, soluble components can change state and become solid. When this change of state occurs, the solids are easily collectable with conventional means such as a filter.

Conventional methods of chemically treating a process waste stream do two basic things. They change the soluble heavy metal to a soluble non-hazardous chemical and/or attract the heavy metal with a flocculating chemical. This process adds to the volume of solids and dilutes the sludge with solids. In most cases the solids are of no practical value. Other methods mechanically attract the soluble or insoluble metals by electrical charges within a bed or a plate. These methods again pose problems of adding to the volume and cause problems of reclaim or disposal.

The vapor compression distillation process and mechanical design provides a practical method of precipitating out of solution heavy metals and other components of a waste stream as solids. Many components will have different precipitation points and the distillation process may be used to precipitate a specific solid.

The continuous circulation system discussed previously with reference to FIG. 7 of the drawings can be utilized with both process embodiments for vapor compression distillation. The preferred embodiment illustrated in FIG. 7 can easily be used for filling the apparatus, discharging liquid from the apparatus, or operating to continuously circulate liquid through the apparatus.

EXAMPLES

TEST I
Chemical Analyses

| PARAMETER | UNITS | RAW FROM WASTE | CONCEN-TRATE | EFFLU-FINAL ENT |
|---|---|---|---|---|
| Cd | mg/L | <0.05 | 1.00 | <0.05 |
| Cr | mg/L | 0.09 | 8.4 | <0.02 |
| Cu | mg/L | 33.2 | 8400. | <0.2 |
| Pb | mg/L | <1.0 | 152. | <1.0 |
| Ni | mg/L | 0.4 | 114. | <0.3 |
| Ag | mg/L | <0.1 | <1.0 | <0.1 |
| Zn | mg/L | 44.8 | 6710. | 0.09 |
| pH | SI Units | 11.9 | 10.8 | 7.5 |
| O + G | mg/L | 12. | 110. | 10. |
| CN | mg/L | <0.10 | <0.20 | <0.10 |

TEST II - Chemical Analyses

| PARAMETER | DISTILLATE | CONCENTRATE |
|---|---|---|
| Total Cyanide, ug/L | <20. | <20. |
| TSS | <3.0 | 154. |
| Cadmium | <.01 | 150. |
| Chromium | <.02 | <10. |
| Copper | .02 | <5.0 |
| Lead | <.05 | 23. |
| Silver | <.01 | 0.1 |
| Zinc | .15 | 220. |

TEST III - EPA Guidelines & VACOM Performance
(Parts Per Million)

| | EPA Guidelines (1) | | * * * | Vapor Compression Distillation Apparatus Distillate (2) | |
|---|---|---|---|---|---|
| POLLUTANT | Metal Fin. | Electro-plating | * * | Metal Fin. | Electro-plating |
| Cadmium | 0.26 | 0.70 | * | <0.05 | <0.01 |
| Chromium (T) | 1.71 | 4.00 | * | <0.05 | 0.01 |
| Copper | 2.07 | 2.70 | * | <0.02 | 0.05 |
| Lead | 0.43 | 0.40 | * | <0.10 | <0.01 |

-continued

TEST III - EPA Guidelines & VACOM Performance
(Parts Per Million)

| POLLUTANT | EPA Guidelines (1) | | * * * * | Vapor Compression Distillation Apparatus Distillate (2) | |
| --- | --- | --- | --- | --- | --- |
| | Metal Fin. | Electro-plating | | Metal Fin. | Electro-plating |
| Nickel | 2.38 | 2.60 | * | <0.03 | 0.04 |
| Silver | 0.24 | 0.70 | * | ... | <0.01 |
| Zinc | 1.48 | 2.60 | * | <0.09 | 0.09 |
| Cyanide (T) | 0.65 | 0.20 | * | <0.10 | <0.01 |
| TSS | 31.00 | ... | * | ... | <1.00 |
| Total Metals | ... | 6.80 | * | ... | 0.19 |

(1) Federal Water Pollution Control Act as Amended by the Clean Water Act of 1987 (Public Law 92-500). Monthly average guidelines are shown. Local discharge limits will vary.
(2) EPA approved laboratory analysis and "<" indicates the lowest normal detection level.

TEST IV - Limits & Performance
(Parts Per Million)

| POLLU-TANT | Discharged Limits | | * | Performance (1) | |
| --- | --- | --- | --- | --- | --- |
| | Current | Proposed | * | Distillate | Concentrate |
| Cadmium | 0.07 | 0.07 | * | <0.01 | 150 |
| Chromium | 1.71 | 1.71 | * | <0.02 | <10 |
| Copper | 2.00 | 0.20 | * | <0.02 | <5.0 |
| Lead | 0.43 | 0.43 | * | <0.05 | 23 |
| Nickel (2) | 2.38 | 1.00 | * | 0.12 | 56,000 |
| Silver | 0.24 | 0.24 | * | <0.01 | 0.1 |
| Zinc | 1.48 | 1.48 | * | 0.15 | 220 |
| Cyanide | 0.65 | 0.42 | * | <0.02 | <0.02 |
| BOD | 250 | 250 | * | 26 | (3) |
| (Biological Oxidation Demand) | | | | | |
| TSS | 300 | 300 | * | <03.0 | 154 |
| (Total Suspended Solids) | | | | | |
| pH | 6.0–10.5 | 6.0–8.5 | * | 6.8 | 3.5 |
| (pH Reading by Plating Company's Lab) | | | | | |

CASE: NICKEL PLATING (Process Waste Recovery)
The vapor compression distillation apparatus was filled with municipal water and installed at a nickel plating facility. As the water was distilled, dilute nickel rinse solution was added. Samples were taken when the batch strength reached 125%. Concentrate batch strength ranged from 0% to 125% and is infinitely variable. Concentrate was recycled to the plating tank. The company had the option to dispose the distillate directly to the municipal sewer, recycle to process rinse, or recycle to critical rinse.
The apparatus distilled water with 20% of the energy used by atmospheric evaporators under the same conditions. All resources were recovered with no venting to the atmosphere.
NOTES:
(1) EPA approved laboratory analysis.
(2) Normal batch strength of nickel is 45,000.
(3) Unable to determine due to interference.

TEST V - Limits & Performance

| POLLU-TANT | Discharge Limits | | * | Vapor Compression Distillation Apparatus Performance (1) | |
| --- | --- | --- | --- | --- | --- |
| | Day Av. | Day Max. | * | Raw Waste | Distillate |
| Cadmium | 0.10 | 0.20 | * | | <0.01 |
| Chromium (Total) | 0.50 | 1.00 | * | 0.56 | 0.01 |
| Chromium (Hex) | 0.10 | 0.20 | * | <0.01 | <0.01 |
| Copper | 0.50 | 1.00 | * | 6.95 | 0.05 |
| Lead | 0.10 | 0.20 | * | 0.20 | <0.01 |
| Nickel | 0.50 | 1.00 | * | 0.17 | 0.04 |
| Silver | 0.20 | 0.40 | * | 0.06 | <0.01 |
| Tin | 1.00 | 2.00 | * | 1.30 | <0.50 |
| Zinc | 0.80 | 1.60 | * | 22.70 | 0.09 |
| Cyanide | 0.10 | 0.20 | * | 0.08 | <0.01 |
| Total Metals | | | * | | 0.19 |
| TSS | 30 | 60 | * | 329.0 | <1.00 |
| (Total Suspended Solids) | | | | | |
| pH | 6.0–10.5 | 6.0–8.5 | * | 8.0 | 7.5 |
| (pH Readings by Plating Company's Lab) | | | | | |

CASE: METAL PLATING JOB SHOP
Process Waste Recovery
Conventional chemical treatment of process waste water is used by a metal plating job shop. Discharge limits are seldom achieved. The vapor compression distillation apparatus demonstrated that process waste water is easily distilled and the distillate is well below discharge limits. Plans are to recycle all water back to process and implement zero discharge. Volume of sludge was reduced over 80%. Metal concentration and purity of the sludge provide the plater option to smelt and reclaim all the sludge. The less than two years pay back period does not include smelting cost advantages. Liability for hazardous waste is eliminated and is a valuable intangible benefit.
NOTES: (1) EPA approved laboratory analysis and stated in ppm.

TEST VI - Limits & Performance
(Parts Per Million)

| POLLU-TANT | Permit | * | Vapor Compression Distillation Appearance Performance | | |
| --- | --- | --- | --- | --- | --- |
| | | * | Waste | Concentrate | Distillate (1) |
| Cadmium | 0.05 | * | <0.05 | 1.00 | <0.05 |
| Chromium (T) | 1.71 | * | 0.09 | 8.40 | <0.05 |
| Copper | 1.00 | * | 32.20 | 8400.00 | <0.02 |
| Lead | 0.10 | * | <1.00 | 152.00 | <0.10 |
| Nickel | 0.50 | * | 0.40 | 114.00 | <0.30 |
| Zinc | 1.00 | * | 44.80 | 22.70 | <0.09 |
| Cyanide | 0.42 | * | <0.10 | <0.20 | <0.10 |
| pH | 6.0–8.5 | * | 11.90 | 10.80 | 7.50 |

CASE: METAL FINISHING (Process Waste Recovery)
A total process waste stream was managed by the vapor compression distillation apparatus at a metal finishing operation. The vapor compression distillation apparatus provides zero discharge & financial payback within 2 years. All process waste water is recovered as distilled water and recycled to process. Sludge volume was reduced 80%. About 50% of heavy metals were recovered for resale. Municipal water purchases will be reduced over 90% and the sanitary sewer is to be cemented closed.
NOTES: (1) EPA approved laboratory analysis.

TEST VII - Filtration Performance
(Parts Per Million)

| POLLUTANT | Waste Stream | | * | Filtered Process |
| --- | --- | --- | --- | --- |
| | Raw | Concentrate | * | Waste Concentrate (1) |
| Copper | 33.2 | 8,760 | * | 11.7 |
| Zinc | 44.8 | 5,810 | * | 6.5 |
| TSS | 269.0 | 35,000 | * | 36.0 |
| (Total Suspended Solids) | | | | |

CASE: METAL FINISHING (Process Waste Recovery)
An industrial process waste stream was concentrated to about 10% of the original volume by vapor compression distillation apparatus and processed through a 10 micron cartridge type filter. Filter water was recycled to the vapor compression distillation apparatus. The "filtered concentrate" shows the amount of solids passing through the filter. It is suspected that the dissolved metals precipitated during the process which made it possible for the filter to effectively capture so large a percentage. The "filtered concentrate" has fewer pollutants than the original entering solution.

NOTES: (1) EPA approved laboratory analysis.

It is thus seen that the present invention provides an improved process and apparatus for vapor compression distillation. It is also seen that the present invention provides a process and apparatus for vapor compression distillation which are highly efficient and economical as well as less complex than prior art processes. It is also seen that the present invention provides such a vapor compression distillation process and apparatus which can easily be used for a variety of processes, including purifying impure water and resource recovery. It is further seen that the present invention provides a vapor compression distillation process and apparatus which utilizes strategically located components for maximum stratification of temperature and non-condensable gases. It is still further seen that the present invention provides a vapor compression distillation process and apparatus which has improved sanitary advantages. It is still further seen that the present invention provides a vapor compression distillation process and apparatus which accomplishes distillation without scale build-up on the heat transferring surfaces. Many variations are apparent to those of skill in the art, and such variations are embodied within the spirit and scope of the present invention as measured by the following appended claims.

That which is claimed:

1. A vapor compression distillation apparatus comprising:

a container having a substantially horizontal longitudinal center axis;

two opposing end plates closing each end of the container;

a first and second passage area defined within and on opposing ends of the container, each adjacent one of said end plates;

a collecting chamber defined within the container between said first and second passage areas;

a plurality of generally horizontal tubes spacedly disposed within said collecting chamber generally parallel to the longitudinal axis of the container, each of said tubes having two opposing ends which open into said first and second passage areas respectively;

two opposing plates positioned on opposite ends of said horizontal tubes, each plate engaging similar ends of said horizontal tubes;

elastomer grommets sealing said horizontal tubes with said plates positioned on opposite ends of said horizontal tubes;

a vapor compressor attached to the container such that said vapor compressor communicates directly with an upper area of said collecting chamber and with said second passage area;

at least one passage for passing a liquid into or out of said collecting chamber at a bottom area of said collecting chamber; and a first conduit for passing a liquid into or out of said first passage area at a bottom area thereof.

2. A vapor compression distillation apparatus according to claim 1 further including a heat exchanger for heating said liquid prior to its entrance into said container.

3. A vapor compression distillation apparatus according to claim 1 further comprising:

a plurality of spaced heating tubes extending at least partially through said collecting chamber between said horizontal tubes; and a second conduit for passing a liquid into or out of said second passage area defined at a bottom area thereof;

whereby a feed material can be passed into said collecting chamber and brought to a boil within said collecting chamber thereby producing a vapor from some of the feed material and a concentrate from a remainder of the feed material;

whereby the vapor formed can pass into said vapor compressor wherein the vapor is elevated in pressure and passes through said second passage area where the pressurized vapor is directed into said horizontal tubes and condenses, giving up heat to the feed material within said collecting chamber and forming a distillate therein which passes through said first passage area or said second passage area to exit through said first or second conduit.

4. A vapor compression distillation apparatus according to claim 3 wherein said heating tubes are positioned proximate an upper portion of said collecting chamber such that said heating tubes are proximately below a predetermined level for feed material therein.

5. A vapor compression distillation apparatus according to claim 2 further including a plurality of baffles positioned within said first and second passage areas for directing vapor into said tubes along a path toward the bottom of said collecting chamber.

6. A vapor compression distillation apparatus according to claim 5 wherein said baffles define small apertures therein.

7. A vapor compression distillation apparatus according to claim 6 wherein said heating tubes are generally perpendicular to said horizontal tubes and are positioned above a bottom of said collecting chamber proximate the level of the feed material.

8. A vapor compression distillation apparatus according to claim 3 further comprising an exit defined at a bottom of said collecting chamber, said exit adapted for exit of said concentrate formed within said collecting chamber.

9. A vapor compression distillation apparatus according to claim 8 wherein the exit communicates with the level of the feed material.

10. A vapor compression distillation apparatus according to claim 9 wherein the exit communicates with an area immediately above the predetermined level of the feed material.

11. A vapor compression distillation apparatus according to claim 1 wherein:

said first conduit is for flow of a feed material therein;

said horizontal tubes are for containing a feed material at a predetermined level therein; and whereby the feed material can pass through said first conduit into said first passage area to be dispersed into said horizontal tubes to said predetermined level, wherein the feed material can boil, thereby producing vapor from some of the feed material and concentrate from a remainder of the feed material and the vapor can pass through said second passage area and into said vapor compressor wherein the vapor is elevated in pressure and can pass into said collecting chamber to be condensed, giving up its heat while surrounding said horizontal tubes, and forming a distillate therein which exits through said passage at the bottom of said collecting chamber, while the concentrate passes from said horizontal tubes through said second passage area and exits through said exit.

12. A vapor compression distillation apparatus according to claim 11 wherein said first passage area includes a heater therein proximate said conduit.

13. A vapor compression distillation apparatus according to claim 11 further including a partition longitudinally positioned within said first passage area generally parallel to said end plates and substantially dividing said first passage area, but still allowing a flow of feed material therethrough.

14. A vapor compression distillation apparatus according to claim 11 wherein said horizontal tubes define a small orifice in the ends which open into said first passage area.

15. A vapor compression distillation apparatus according to claim 14 wherein said horizontal tubes further define barriers in the ends which open into said second passage area, said barriers maintaining feed material at the predetermined level within said tubes and allowing flow of concentrate over said barriers, said barriers positioned a distance from an upper portion of each tube such as to allow vapor formed therein to exit said tubes.

16. A process of producing a concentrate and a distillate from a feed material comprising the steps of:
providing a vapor compression distillation apparatus comprising;
a container having a substantially horizontal longitudinal center axis,
two opposing end plates closing each end of the container,
a first and second passage area defined within and on opposing ends of said container, each adjacent one of said end plates,
a collecting chamber defined within said container between said first and second passage areas,
a plurality of generally horizontal tubes spacedly disposed within said collecting chamber generally parallel to the longitudinal axis of said container, each of said tubes having opposing ends which open into said first and second passage areas,
a vapor compressor attached to said container such that said vapor compressor communicates with an upper area of said collecting chamber and communicates with said second passage area,
a passage for the passing of feed material into said collecting chamber, said passage defined at a bottom area of said collecting chamber,
an exit for the passing of a concentrate out of said collecting chamber,
a first and second conduit for passing a liquid into or out of said first passage area and said second passage area defined at bottom areas thereof, and
a plurality of spaced heating tubes extending through said collecting chamber;
passing a continuous supply of a feed material through said passage into said collecting chamber to a predetermined level such that the feed material surrounds the horizontal tubes;
boiling the feed material in said collecting chamber, thereby producing a vapor from some of the feed material and a concentrate from a remainder of the feed material;
passing the vapor to said vapor compressor;
simultaneously passing the concentrate out of said collecting chamber through said exit;
compressing and elevating the pressure of the vapor;
passing the compressed vapor through said second passage area and then through said horizontal tubes;
condensing the vapor in said horizontal tubes as distillate thereby giving up heat to the feed material within said collecting chamber;

directing the distillate into said first passage area or said second passage area and out of said first or second conduit.

17. A process according to claim 16 wherein feed material is caused to continuously circulate through said apparatus by a pump communicating therewith.

18. A process of producing a concentrate and a distillate from a feed material according to claim 16 wherein an operating temperature of less than approximately two hundred twenty (220° F.) degrees Fahrenheit is maintained so as to prevent scale build-up from forming on any heat transferring surfaces.

19. A process of producing a concentrate and a distillate from a feed material according to claim 16 further comprising heating the feed material prior to passing it through said first passage.

20. A process of producing a concentrate and a distillate from a feed material according to claim 19 wherein the feed material is heated in heat exchange relation with the concentrate and distillate produced prior to passing the feed material into said collecting chamber.

21. A process of producing a concentrate and a distillate from a feed material comprising the steps of:
providing a vapor compression distillation apparatus comprising;
a container having a substantially horizontal longitudinal center axis,
two opposing end plates closing each end of the container,
a first and second passage area defined within and on opposing ends of said container, each adjacent one of said end plates,
a collecting chamber defined within said container between said first and second passage areas,
a plurality of generally horizontal tubes spacedly disposed within said collecting chamber generally parallel to the longitudinal axis of said container, each of said tubes having opposing ends which open into said first and second passage areas and adapted to hold feed material at a predetermined level therein,
a vapor compressor attached to said container such that said vapor compressor communicates with an upper area of said collecting chamber and communicates with said second passage area,
a passage for passing distillate out of said collecting chamber defined at a bottom area of said collecting chamber,
a first and second conduit for passing a liquid into or out of said first and second passage areas defined at bottom areas thereof, and
passing a continuous supply of feed material through said first conduit into said first passage area;
directing the feed material into said horizontal tubes a predetermined level;
boiling the feed material within said horizontal tubes, thereby producing a vapor from some of the feed material and concentrate from a remainder of the feed material;
directing the vapor through said second passage area into said vapor compressor and the concentrate through said second passage area and out said second conduit;
compressing and elevating the pressure of the vapor;
passing the compressed vapor into said collecting chamber;
condensing the vapor as distillate in said collecting chamber surrounding said horizontal tubes thereby giving up heat to the feed material within said horizontal tubes;

directing the distillate out of said collecting chamber through said passage.

22. A process of producing a concentrate and a distillate from a feed material according to claim 21 further comprising heating the feed material prior to passing it through said conduit.

23. A process according to claim 21 wherein feed material is caused to continuously circulate through said apparatus by a pump communicating therewith.

24. A vapor compression distillation apparatus comprising:

a container having a substantially horizontal longitudinal center axis;

two removable opposing end plates closing each end of the container;

a first and second passage area defined within and on opposing ends of the container, each adjacent one of said end plates;

a collecting chamber defined within the container between said first and second passage areas;

a plurality of generally horizontal tubes spacedly disposed within said collecting chamber generally parallel to the longitudinal axis of the container, each of said tubes having two opposing ends which open into said first and second passage areas respectively;

two opposing plates positioned on opposite ends of said horizontal tubes, each plate engaging similar ends of said horizontal tubes;

a vapor compressor attached to the container such that said vapor compressor communicates with an upper area of said collecting chamber and with said second passage area;

at least one passage for passing a liquid into or out of said collecting chamber at a bottom area of said collecting chamber; and a first conduit for passing a liquid into or out of said first passage area at a bottom area thereof.

25. A process for producing a concentrate and a distillate from a feed material comprising the steps of:

passing a feed material into horizontal tubes which pass through a collecting chamber to a predetermined level wherein an upper longitudinal area within each of the horizontal tubes remains unoccupied by the feed material;

boiling the feed material within the horizontal tubes producing a vapor from some of the feed material and concentrate from a remainder of the feed material;

compressing and elevating the vapor and passing the compressed vapor to the collecting chamber;

condensing the vapor as distillate in the collecting chamber giving up heat to feed material in the horizontal tubes.

* * * * *